United States Patent
Ishihara et al.

(10) Patent No.: US 8,996,204 B2
(45) Date of Patent: Mar. 31, 2015

(54) SYSTEMS AND METHODS FOR ADJUSTING TARGET APPROACH SPEED

(75) Inventors: Yasuo Ishihara, Kirkland, WA (US); Steve Johnson, North Bend, WA (US)

(73) Assignee: Honeywell International Inc., Morristown, NJ (US)

( * ) Notice: Subject to any disclaimer, the term of this patent is extended or adjusted under 35 U.S.C. 154(b) by 421 days.

(21) Appl. No.: 12/821,445

(22) Filed: Jun. 23, 2010

(65) Prior Publication Data

US 2011/0320070 A1    Dec. 29, 2011

(51) Int. Cl.
G05D 1/00    (2006.01)
G05D 1/06    (2006.01)

(52) U.S. Cl.
CPC .................................. G05D 1/0676 (2013.01)
USPC .......................... 701/9; 701/4; 701/7; 701/16

(58) Field of Classification Search
CPC ..... G05D 1/0676; G05D 1/101; G01C 23/00; G01C 21/00; G01C 23/005; G08G 5/025; G08G 5/0021
USPC .......... 340/963, 967, 969, 970; 701/4, 7, 8, 9, 701/14, 16
See application file for complete search history.

(56) References Cited

U.S. PATENT DOCUMENTS

| | | | | |
|---|---|---|---|---|
| RE25,093 | E * | 12/1961 | Johanson et al. ............. | 200/81.4 |
| 3,271,542 | A * | 9/1966 | Hradek ......................... | 200/81.5 |
| 4,312,041 | A * | 1/1982 | DeJonge ....................... | 701/123 |
| 4,423,593 | A | 1/1984 | Zagranski et al. | |
| 4,490,793 | A | 12/1984 | Miller | |
| 5,220,322 | A * | 6/1993 | Bateman et al. ............... | 340/970 |
| 5,343,395 | A * | 8/1994 | Watts ............................. | 701/16 |
| 5,523,949 | A * | 6/1996 | Agate et al. .................... | 701/17 |
| 6,112,141 | A * | 8/2000 | Briffe et al. .................... | 701/14 |
| 2004/0035978 | A1 | 2/2004 | Almeras | |
| 2004/0189492 | A1 * | 9/2004 | Selk et al. ...................... | 340/973 |
| 2004/0210355 | A1 * | 10/2004 | Gaidelis et al. .................. | 701/4 |
| 2008/0125921 | A1 * | 5/2008 | Baxter ............................. | 701/3 |
| 2011/0320070 | A1 * | 12/2011 | Ishihara et al. ................. | 701/16 |

FOREIGN PATENT DOCUMENTS

CN    1413289 A    4/2003

OTHER PUBLICATIONS

Karen Crabtree; Honeywell Develops Safety Product to Reduce Runway Excursions; Jun. 15, 2009; Honeywell press release.*
CN Office Action for Application No. CN201110169321.0 dated Sep. 22, 2014.

* cited by examiner

*Primary Examiner* — Stephen Holwerda
(74) *Attorney, Agent, or Firm* — Ingrassia Fisher & Lorenz, P.C.

(57) ABSTRACT

Systems and methods for adjusting target approach speed for use in a "Too Fast" approach to landing condition. An exemplary system stores predefined maximum wind setting and a predefined reference speed and a pilot set bug speed value. A processing device sets a target speed equal to the bug speed, if the bug speed is less than the reference speed plus a value associated with a predefined maximum wind setting, and sets the target speed equal to the reference speed plus the max wind added value, if the manual bug speed is not less than the reference speed plus the max wind added value. An output device outputs an alert if the received aircraft speed is greater than the set target speed plus a predefined error value when the received aircraft location is within a threshold value of a touchdown point.

15 Claims, 6 Drawing Sheets

SYSTEMS AND METHODS FOR ADJUSTING TARGET APPROACH SPEED

BACKGROUND OF THE INVENTION

In the current SmartLanding™ algorithm by Honeywell, Inc., a "Too Fast" threshold cannot be less than 30 knots (kts) above a reference speed ($V_{REF}$). In some aircraft installations (such as Boeing) the SmartLanding™ function does not receive the wind/gust information. Therefore, the "Too Fast" function needs to add 20 kts to $V_{REF}$ plus another 10 kts technical error value. Because of this limitation, the aircraft has to fly at very high speed to be able to trigger the "Too Fast" alert.

As shown in FIG. 1, the $V_{REF}$ is 124 kts. Thus, the aircraft's speed needs to exceed 154 kts before a "Too Fast" alert is triggered. FIG. 1 represents a condition with little or no headwind/gust. However, no alert is generated even though the aircraft's actual speed is 149 kts which is quite a bit higher than a bug setting speed (~129 kts).

SUMMARY OF THE INVENTION

The present invention provides systems and methods for adjusting target approach speed for use in a "Too Fast" approach to landing condition. An exemplary system includes a memory that stores predefined maximum wind setting and a predefined reference speed. A user interface device provides a pilot set bug speed value. A processing device that is in signal communication with the memory and the user interface device receives aircraft speed, the predefined reference speed, the pilot set bug speed value, and aircraft location information, sets a target speed equal to the pilot set bug speed if the pilot set bug speed is less than the reference speed plus a value associated with a predefined maximum wind setting, and sets the target speed equal to the reference speed plus the max wind added value if the manual pilot set bug speed is not less than the reference speed plus the max wind added value. An output device that is in signal communication with the processing device outputs an alert if the received aircraft speed is greater than the set target speed plus a predefined error value, when the received aircraft location is within a threshold value of at least one of a landing or touchdown point.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 2:
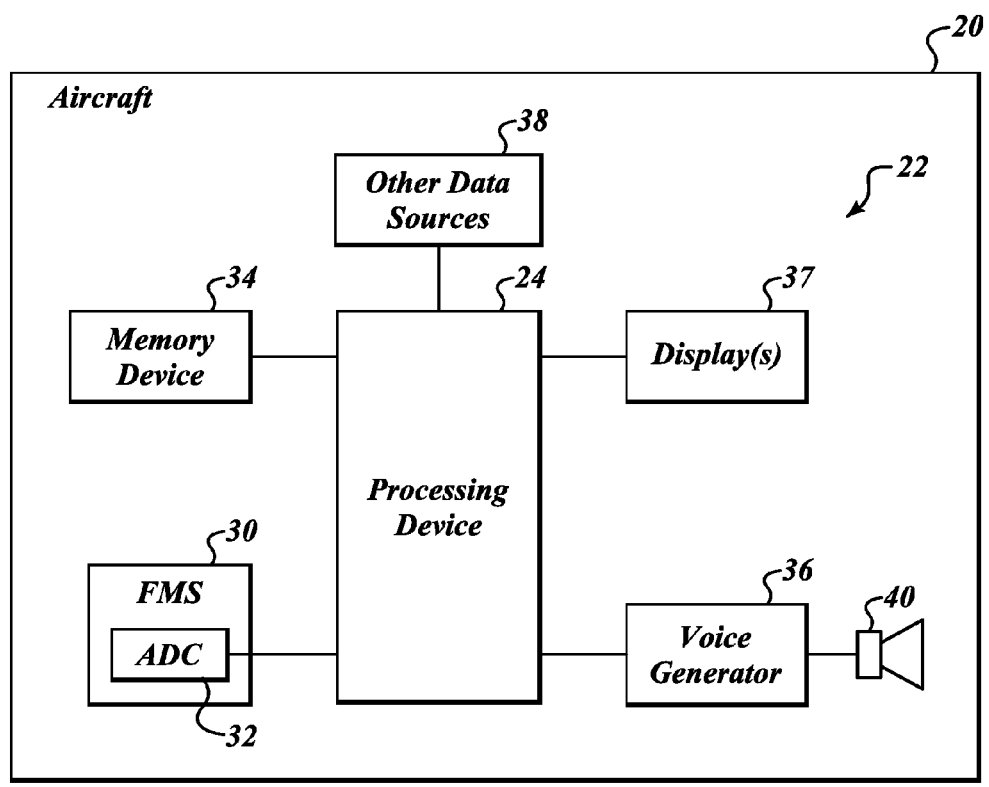
FIG. 2 illustrates a schematic block diagram of an exemplary system formed in accordance with an embodiment of the present invention.

As shown in FIG. 2, an aircraft 20 includes a system 22 for providing information assistance to pilots with regard to aircraft operation between approach gates when approaching to land. The system 22 includes a processing device 24 that is in data communication with a memory device 34 and flight and aircraft configuration sensors either directly (other data sources 38, such as by using discrete signals) or via a flight management system (FMS) 30, which in one embodiment includes an air data computer (ADC) 32. Also, the processing device 24 is in data communication with one or more displays 37 and a voice generator 36 that is connected to one or more speakers 40.

If the processing device 24 determines that aircraft parameters that are received from the FMS 30 or directly from other data sources 38 indicate that the aircraft 20 is not being flown in accordance with company policies or procedures (e.g., standard operating procedures) as they pertain to stability of the aircraft between predefined approach gates, then the processing device 24 produces advisories that are outputted via the displays 37 and/or the speakers 40 via the voice generator 36.

Figure 3:
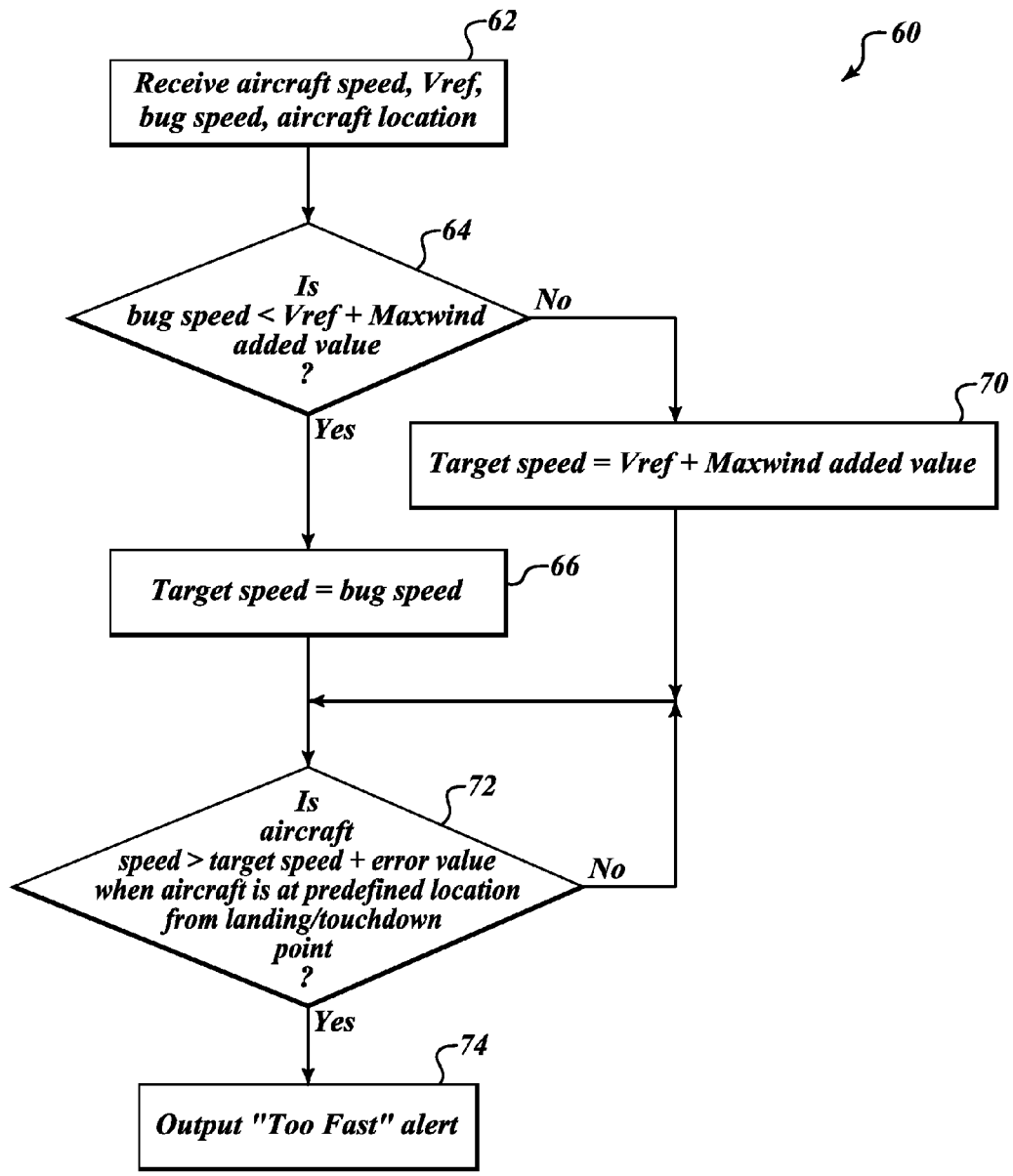
FIG. 3 illustrates an exemplary method performed by the system shown in FIG. 2 in accordance with an embodiment of the present invention.

FIG. 3 illustrates an exemplary process 60 performed by the processing device 24 shown in FIG. 2. First, at a block 62, the processing device 24 receives aircraft speed, a previously set reference speed ($V_{REF}$), a manually set bug speed, and current aircraft location information. Next, at a decision block 64, the processing device 24 determines if the bug speed is less than $V_{REF}$+a max wind added value. If the processing device 24 determines that the bug speed is less than the combination of $V_{REF}$+max wind added value, then at a block 66, the processing device 24 makes a target speed equal to the bug speed. If, at the decision block 64, the bug speed is not less than $V_{REF}$+the max wind added value, then at a block 70, the target speed is made equal to $V_{REF}$+the max wind added value. After the blocks 66 and 70, at a decision block 72, the processing device 24 determines if the aircraft speed is greater than the recently defined target speed plus a predefined error value (e.g., 10 kts) when the aircraft is at a predefined location (i.e., approach gate) from a landing/touchdown point. If the processing device 24 determines that the aircraft speed is not greater than the target speed, then this step repeats at a predefined frequency or returns to the beginning of the process 60 if some other situation occurs, such as a resetting of the system or an identified change made to the bug speed or some other setting. If, at the decision block 72, the aircraft speed is greater than the target speed plus a predefined error value when the aircraft is at the predefined location from the landing/touchdown point, then at a block 74 the processing device 24 outputs a "Too Fast" or similar alert via one of the output devices.

Figure 1:
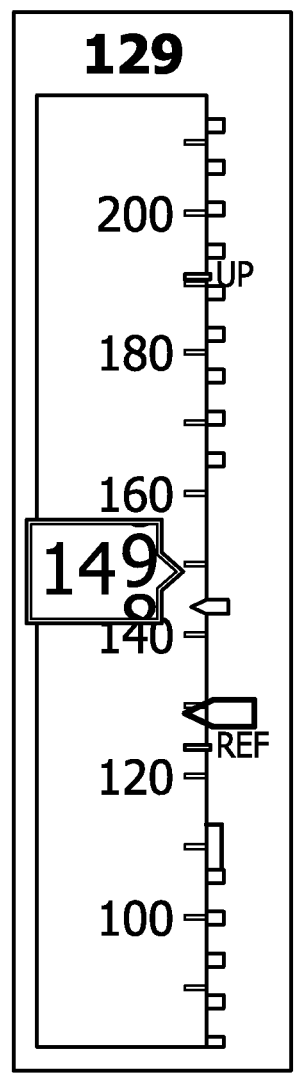
FIGS. 1, 4, and 5 illustrate aircraft speed gauges during different approach-to-landing conditions.

FIG. 1 represents a condition with little or no headwind/gust. Because the bug speed is set less than $V_{REF}$ (124 kts)+ max wind added value (20 kts), the bug speed becomes the target approach speed. Any aircraft speed above 139 kts triggers "Too Fast" alert, because the aircraft speed is greater than the target speed (139 kts)+the predefined error value (e.g., 10 kts).

Figure 4:
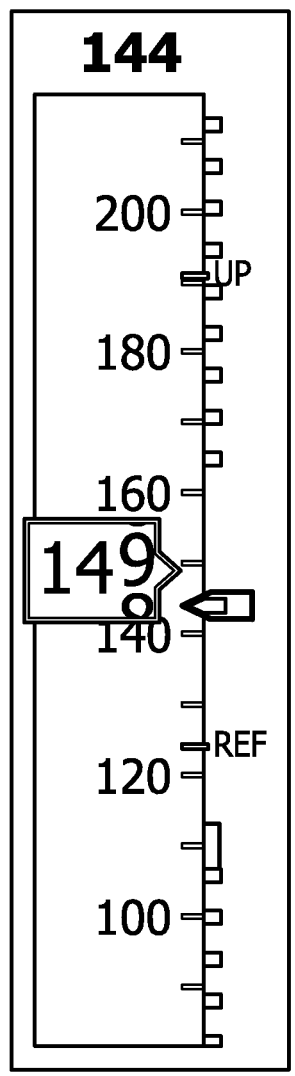

FIG. 4 represents a condition with strong headwind and gust. The bug speed is set to 144 which is 20 kts above $V_{REF}$ (124 kts). Because the bug speed is greater than $V_{REF}$+max wind added value (20 kts), then the "target" approach speed is 144 (124 kts+20 kts). In this case, the aircraft is not flying faster than the target speed plus a predefined error value and no alert is generated.

Figure 5:
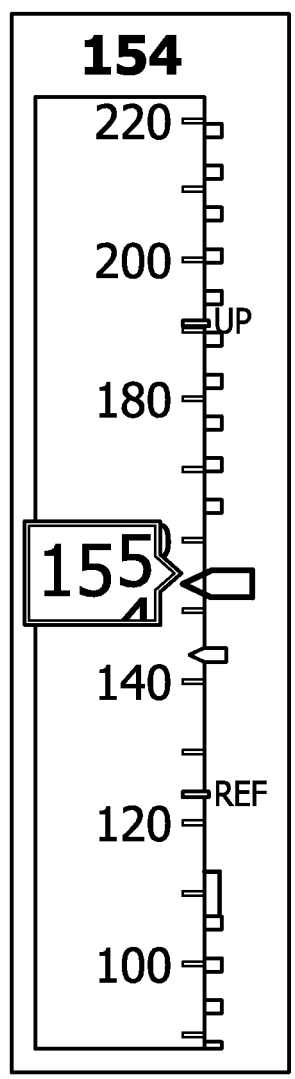

FIG. 5 represents a situation where the bug speed is set (or left) at more than 20 kts (max added value) above $V_{REF}$ (124 kts). The target approach speed is set to $V_{REF}$+20 (or 144 kts). Therefore, in this example, because the aircraft's speed is 155 kts (11 kts above the target approach speed plus a predefined error value), a "Too Fast" alert is issued.

Figure 6:
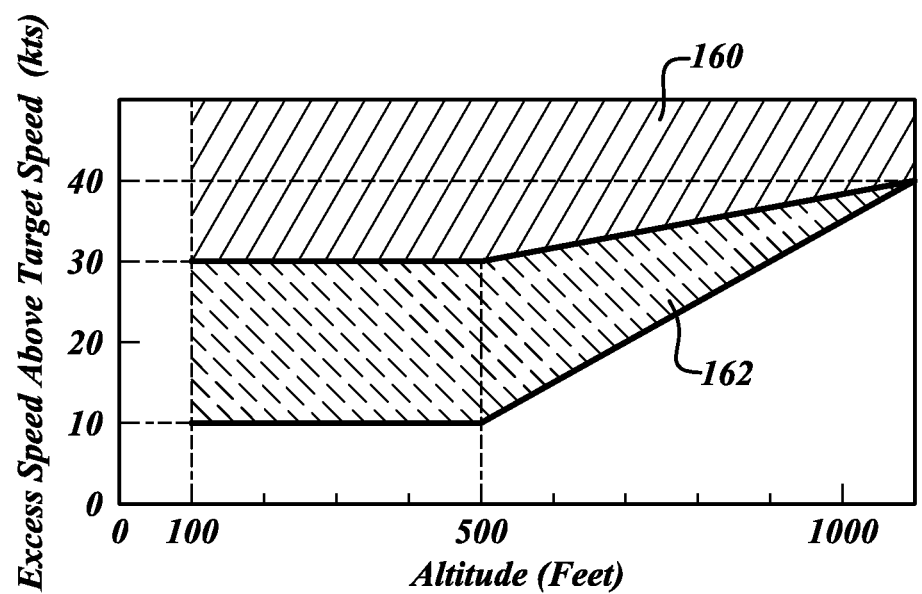
FIG. 6 illustrates a graph showing a more sensitive excessive speed threshold formed in accordance with an embodiment of the present invention.

FIG. 6 is a graph showing an excess speed envelope as defined by the present invention. A first envelope 160 identifies the excess speed threshold as defined by the prior art. The first envelope 160 causes alerts if the aircraft speed is greater than 30 kts above $V_{REF}$ between altitudes of 100 and 500 feet. The excess speed above $V_{REF}$ (Y-axis) gradually increases as the altitude (X-axis) increases. An additional envelope 162 reduces the lower threshold of the first envelope 160 during conditions where a bug speed is less $V_{REF}$+the max wind added value. In this example, if the bug setting was set at the same as $V_{REF}$, then the lower end of the additional envelope 162 (excess speed threshold) is the error value or 10 kts for example.

While the preferred embodiment of the invention has been illustrated and described, as noted above, many changes can be made without departing from the spirit and scope of the invention. For example, the processing device 24 or functions performed by the processing device 24 may be included as part of existing devices, such as the FMS 30 or an enhanced ground proximity warning system (EGPWS) (not shown), or may be a separate unit. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method comprising: at a processing device located on an aircraft,
   receiving aircraft speed, a predefined reference speed, a manually set bug speed value, and aircraft location information,
   setting a target speed equal to the manually set bug speed value if the manually set bug speed value is less than the reference speed plus a value associated with a predefined maximum wind setting added value, and
   setting the target speed equal to the reference speed plus the maximum wind added value if the manually set bug speed value is not less than the reference speed plus the maximum wind added value to avoid reliance upon the bug speed in the setting the target speed; and
   at an output device in signal communication with the processing device, outputting an alert if the received aircraft speed is greater than the set target speed plus a predefined error value when the received aircraft location is within a threshold value of at least one of a landing or touchdown point.

2. The method of claim 1, wherein the target speed is a target approach speed.

3. The method of claim 1, wherein the predefined reference speed is based on current aircraft altitude above ground.

4. The method of claim 1, wherein outputting comprises outputting at least one of an audible or visual alert.

5. The method of claim 4, wherein the audible alert comprises a prerecorded too fast message.

6. A warning system comprising:
   a memory configured to store a predefined maximum wind setting added value and a predefined reference speed;
   a user interface device configured to receive a pilot set bug speed value;
   a processing device in signal communication with the memory and the user interface device, the processing device configured to
      receive aircraft speed, the predefined reference speed, the pilot set bug speed value, and aircraft location information,
      set a target speed equal to the pilot set bug speed value, if the pilot set bug speed value is less than the reference speed plus a value associated with a the predefined maximum wind setting added value,
      set the target speed equal to the reference speed plus the maximum wind added value, if the pilot set bug speed value is not less than the reference speed plus the maximum wind added value to avoid reliance upon the pilot set bug speed in the warning system; and
   an output device in signal communication with the processing device, the output device configured to output an alert if the received aircraft speed is greater than the set target speed plus a predefined error value when the received aircraft location is within a threshold value of at least one of a landing or touchdown point.

7. The system of claim 6, wherein the target speed is a target approach speed.

8. The system of claim 6, wherein the predefined reference speed is based on current aircraft altitude above ground.

9. The system of claim 6, wherein the output device comprises at least one of an audible or visual alert device.

10. The system of claim 9, wherein the memory comprises a prerecorded too fast message that is outputted via the audible alert device.

11. A warning system comprising:
    a means for receiving aircraft speed, a predefined reference speed, a manually set bug speed value, and aircraft location information;
    a means for setting a target speed equal to the manually set bug speed value, if the manually set bug speed value is less than the reference speed plus a value associated with a predefined maximum wind setting added value;
    a means for setting the target speed equal to the reference speed plus a the maximum wind added value, if the manually set bug speed value is not less than the reference speed plus the maximum wind added value to avoid reliance upon the manually set bug speed in the warning system; and
    a means for outputting an alert if the received aircraft speed is greater than the set target speed plus a predefined error value when the received aircraft location is within a threshold value of at least one of a landing or touchdown point.

12. The system of claim 11, wherein the target speed is a target approach speed.

13. The system of claim 11, wherein the predefined reference speed is based on current aircraft altitude above ground.

14. The system of claim 11, wherein the means for outputting outputs at least one of an audible or visual alert.

15. The system of claim 14, wherein the audible alert comprises a prerecorded too fast message.

* * * * *